United States Patent [19]

Deitrick et al.

[11] Patent Number: 4,920,998

[45] Date of Patent: May 1, 1990

[54] METHOD AND APPARATUS FOR CONTROLLING FLOW BIAS IN A MULTIPLE ZONE PROCESS

[75] Inventors: Bernard E. Deitrick, Yorktown Heights; Patrick J. Murzyn, Tarrytown; Mark S. Nowotarski, Ossining; Raymond P. Roberge, Chappaqua, all of N.Y.

[73] Assignee: Union Carbide Industrial Gases Technology Corporation, Danbury, Conn.

[21] Appl. No.: 421,156

[22] Filed: Oct. 13, 1989

Related U.S. Application Data

[63] Continuation of Ser. No. 170,758, Mar. 21, 1988, abandoned.

[51] Int. Cl.$^5$ ............................. F27B 9/04; F27D 7/06
[52] U.S. Cl. ......................................... 137/3; 137/93; 432/23; 432/37; 432/198
[58] Field of Search ................... 137/2, 3, 93, 118; 432/23, 37, 198, 11, 17

[56] References Cited

U.S. PATENT DOCUMENTS

| | | | |
|---|---|---|---|
| 4,118,873 | 10/1978 | Rothchild | 34/36 |
| 4,191,598 | 3/1980 | Conybear et al. | |
| 4,223,450 | 9/1980 | Rothchild | 137/93 X |
| 4,298,341 | 11/1981 | Nowack | |
| 4,323,092 | 4/1982 | Zabel | 137/93 X |
| 4,365,954 | 12/1982 | Petzi | |
| 4,448,616 | 5/1984 | Francis et al. | |
| 4,490,108 | 12/1984 | Petzi | 432/23 |
| 4,496,316 | 1/1985 | Tsai | |
| 4,506,726 | 3/1985 | Tsai | |
| 4,543,060 | 9/1985 | Bowes | 432/23 |
| 4,551,091 | 11/1985 | Paterson | 432/23 |
| 4,654,802 | 3/1987 | Davis | 137/3 X |

*Primary Examiner*—Stephen M. Hepperle
*Attorney, Agent, or Firm*—A. H. Fritschler

[57] ABSTRACT

The present invention provides a method and apparatus for controlling the fluid flow bias of continuous, multiple zone processes having gas or vapor comprising atmospheres that are in immediate access to each other. Active control of the fluid flow bias in at least one process zone or control of the overall process fluid flow bias is achieved by applying force to at least one of the zones of the process in a manner which enables such control. A physical or chemical property or a change thereof in at least one process atmosphere is monitored and an appropriate amount of force is applied in response to the monitored property. The monitored property is related to the furnace flow bias by an algorithm, so that the flow bias can be controlled by controlling the at least one chemical or physical property monitored.

6 Claims, 4 Drawing Sheets

FLOW BIAS CONTROL SYSTEM

FIG. 1

HEAT TREATING FURNACE

FURNACE FLUID FLOW BIAS

FIG. 2A — EQUAL FLOW BIAS

FIG. 2B — INCREASED BIAS TO RIGHT

FIG. 2C — INCREASED BIAS TO LEFT

FIG. 3

FLOW BIAS CONTROL SYSTEM

METHOD AND APPARATUS FOR CONTROLLING FLOW BIAS IN A MULTIPLE ZONE PROCESS

This application is a continuation of prior U.S. application Ser. No. 170,758, filed Mar. 21, 1988, now abandoned.

BACKGROUND OF THE INVENTION

1. Field of the Invention

Often continuous processes utilize multiple zones having gas-comprising atmospheres in a substantially enclosed space with the atmosphere of each zone having immediate access to the atmosphere of an adjacent zone. Such processes, for example processes conducted in a continuous furnace, frequently do not generate consistent high quality product because of inability to control fluid flows between furnace zones and at furnace entrances and exits. Inability to maintain fluid flow control within the furnace causes variation in the atmosphere composition or other intensive properties within a given zone over a time period; for example, as furnace fluid flows change, the composition of individual atmospheres within furnace zones can be affected and the segregation between differing zone atmospheres can be disturbed. The present invention provides a method of controlling fluid flows within a process comprised of multiple zones having atmospheres which are interconnected, such as the multiple zones in a continuous furnace, so the intensive properties of particular atmospheres within particular zones and the segregation of differing atmospheres can be maintained. A more consistent quality product is obtained using the method of the present invention. The atmosphere may be defined as comprising a particular fluid composition, e.g., a gas, vapor or mixture thereof located in a particular zone, and having a pressure and a temperature.

2. Background Art

Furnaces are used in continuous processes dealing with a myriad of products ranging from metal and polymer processing to foodstuff processing to electronics manufacture. The method of the present invention can be used wherever it is desired to control the fluid flow in an individual zone of a multiple zone process or the overall fluid flow of a multiple zone process, such as a process carried out in a continuous furnace. The term "continuous furnace" is an art-recognized term having known meaning to an engineer skilled in the art. The method of the present invention can also be used for control in other fluid flow systems, such as continuous food freezers, ducts, and vents, for example. However, since it is not necessary for an understanding of this invention to discuss all such possibilities herein, the principles involved will be discussed in terms of a continuous furnace having multiple zones.

Nowack U.S. Pat. No. 4,298,341, dated Nov. 3, 1981, describes an industrial oven having air recirculating means for minimizing heat loss. A nozzle for feeding hot air is directed downwardly into the oven in the vicinity of the oven access opening to minimize the escape of hot air through the access opening. The invention is directed to a single zone furnace or oven, however, and is not concerned with the control of fluid flow bias (as defined at pages 8 and 9 herein) in a multiple zone furnace. The invention also does not address the problem of infiltration of gas having a different composition from an external location into the furnace.

Petzi U.S. Pat. No. 4,365,954, dated Dec. 28, 1982 describes a continuous electric tunnel furnace for firing ceramic articles. The atmosphere in the furnace comprises an oxygennitrogen mixture. It is desired to decrease the oxygen content progressively from the furnace entrance toward the furnace exit, so that no oxygen is present in the cooling portion of the furnace near the exit. This is accomplished using a combination of nitrogen gas feed into the furnace exit area in an orientation against the direction of article movement toward the exit, and at least one gate (extending from the furnace tunnel roof into the inner space of the tunnel) to provide a braking effect on the velocity of atmosphere movement within the furnace.

Francis, Jr. et al. U.S. Pat. No. 4,448,616, dated May 15, 1984 discloses a process for reducing backmixing or backflow of ambient gases surrounding a heat treating furnace into the furnace entrance and exit openings. Gas jets are positioned at about the top and across the width of at least one of the furnace openings. The problem of controlling fluid flow bias within zones of a multiple zone furnace is not addressed.

Bowes U.S. Pat. No. 4,543,060, dated Sept. 24, 1985 describes a method of preventing air from leaking into the furnace as workpieces enter or exit the furnace. A sensor is placed at at least one end of the furnace and as the workpiece passes the sensor, the sensor sends a signal to the furnace gas supply source which increases the overall gas flow rate to the furnace. Increasing the overall gas flow rate causes more furnace gas to exit the furnace, thus preventing the entrance of ambient air into the furnace. Again, there is no suggestion of any means for controlling the fluid flow bias within the furnace.

Tsai U.S. Pat. No. 4,506,726, dated Mar. 26, 1985 discloses a method of redistributing gas flow within a regenerator using air jets. A regenerator is a form of heat exchanger used in combination with flat glass manufacturing furnaces. The regenerator comprises a gas pervious bed of refractory material, such as a stacked arrangement of bricks. Gas flows through the regenerator are made more uniform using air jet means to counteract longitudinal flow tendencies in the gas distributing space joining a flue to a bed of packing. This invention is concerned with permanently altering the fluid flow rate through a porous/pervious bed leading to a vent rather than with actively controlling fluid flow bias in a relatively open multiple zone enclosed space.

Tsai U.S. Pat. No. 4,496,316, dated Jan. 29, 1985 discloses a method and apparatus for selective control of combustion gas flow in a furnace firing port. A small quantity of pressurized gas is injected generally along the flow path of combustion air in the plenum to alter the amount of combustion air flowing into the firing port. The invention does not concern fluid flow bias in a multiple zone furnace.

Conybear et al. U.S. Pat. No. 4,191,598, dated Mar. 4, 1980 describes a method and apparatus for recirculation of atmosphere in a vacuum furnace. The furnace atmosphere is continually analyzed and replenished as needed. There is no disclosure related to control of fluid flow bias within a multiple zone enclosed space.

Heat treating processes such as carbon steel brazing, stainless steel brazing, annealing, normalizing, glass-to-metal sealing, copper-thick film firing, and decarburizing may all be performed in a continuous double open ended belt furnace. Products processed in furnaces of this type are sensitive to the composition, temperature, and pressure of the volatile fluid or gaseous atmosphere in which they are processed. For example, in brazing, the presence of a gaseous atmosphere comprising oxygen in the furnace typically causes metallic oxides to form on the metal surface to be brazed, and this may cause failure of the braze. Thus, the process atmosphere of a furnace during brazing must be kept below specified levels of both water and oxygen, for example.

A typical continuous furnace comprises one or more zones of specified fluid composition, and frequently comprises more than one temperature zone. The parts to be processed are placed on a continuous moving belt and enter and exit the furnace through an entrance vestibule and exit opening, respectively. The furnace may have several different fluid injection or vent points, and furnace atmosphere fluids may exit from both ends of the furnace and from any intermediate vents. The way in which furnace fluids are partitioned between flowing toward the front or toward the rear of the furnace is an important process variable in continuous furnaces since it directly affects the stability of the process atmosphere in a given furnace zone.

Items which directly affect the partitioning of furnace fluid flows include the following: Location and quantity and direction of fluid flow into the furnace; furnace entrance and exit configuration; part movement through the furnace; furnace placement within a building; furnace slope; winds (room or external); active or passive vents; furnace cycling; atmosphere composition; atmosphere burnoff; furnace loading; furnace temperature; and external ambient air temperature and humidity, for example.

Often upon start-up of a new furnace, the furnace fluid flow partitioning is determined and set. However, as changes in the items such as those listed above occur, the furnace flow partitioning drifts or changes from its original condition. Thus, the conditions under which the product is being processed in the furnace are constantly changing as the atmospheres of the furnace zones are changing. Control of the furnace fluid flow partitioning, meaning the active manipulation of fluid flow parameters within the furnace to obtain or maintain the desired atmosphere conditions within one or more of the zones of the furnace, is needed to ensure quality control of the parts being processed in the furnace.

SUMMARY OF THE INVENTION

In accordance with the present invention, there is disclosed a method of controlling a fluid flow bias of a multiple zone process having gascomprising atmospheres with immediate access to each other which comprises the following steps:

(a) monitoring at least one selected chemical or physical property or change in the property of an atmosphere within at least one of the multiple zones of a process, wherein the property or change in the property monitored is indicative of existing flow bias or indicative of a change in flow bias within the at least one zone; and, (b) actively applying force within at least one process zone in response to the monitored property or change in property in a manner which essentially enables control of the flow bias via control of the selected chemical or physical property or change therein within a specified range from or at a set point.

This invention also involves an apparatus for controlling a fluid flow bias in a multiple zone process having fluid-comprising atmospheres with immediate access to each other, the apparatus comprising the following elements:

(a) at least one sampling means for sampling an atmosphere from at least one zone of the multiple zone process;

(b) means for analyzing the sample for at least one chemical or physical property or a change in the chemical or physical property which is indicative of the existing flow bias or indicative of a change in the flow bias within the monitored process zone(s), the analyzing means in communication with the sampling means;

(c) means for comparing the property value or change in property value determined in step (b) with a reference set point or range for the property or change in property and determining an appropriate force response necessary to provide control of the physical property or change in property, the response determining means in communication with the analyzing means; and (d) means for producing a force response necessary to provide the desired flow bias within at least one of the process zones, the forceproducing means in communication with the means for determining the appropriate force response, whereby the appropriate force response is applied.

In the above apparatus, the sampling means of step (a) and the analyzing means of step (b) may be combined into one instrument means. This is particularly true when such instrument means is located within a process zone (in situ).

DEFINITIONS

Flow bias or fluid flow bias as used in the specification and claims herein is directional in nature. Fluid flow bias is the net fluid flow passing through a plane in a specific direction, which plane comprises one of the surfaces of a defined space. The defined space can be an individual process zone or can be the entire process space, including all of the multiple zones. Thus, the fluid flow bias in direction A at a defined plane is the net quantity of fluid flowing in direction A through the defined plane, wherein the defined plane comprises one of the surfaces of the defined space. In the case of a continuous furnace having an entrance vestibule and an exit opening, the furnace fluid flow bias out of the furnace at the exit opening is the quantity of fluid flowing out of the exit minus the quantity of fluid flowing into the exit.

Control of flow bias as used in the specification and claims herein means the active manipulation of at least one furnace parameter in response to at least one measured furnace parameter which can be related to fluid flow bias, so that the measured furnace parameter is controlled in a manner which controls the fluid flow bias.

Force as used in the specification and claims herein means that which changes the state of rest or motion in matter. Force has a direction, since it is a vector, F.

Furnace atmosphere as used in the specification and claims herein means the fluid occupying a defined space within the process and having a temperature and pressure; the fluid is comprised of at least one gas or vapor or mixtures thereof and may have particles suspended therein.

Zone as used in the specification and claims herein means a construct within an essentially enclosed space or a defined portion of the space within an overall essentially enclosed space. For example, a furnace may have constructed zones in which heating means are placed (hot zone) or refrigeration means are placed (cooling zone). The zone may be a defined portion of space in which the composition or other intensive property of the atmosphere in that defined portion of space differs from the composition or other intensive properties of an atmosphere in an adjacent defined portion of space, e.g. a reducing zone or an oxidizing zone which is adjacent to an inert zone, or one defined portion of space having a fluid flow bias in direction A adjacent to a second defined portion of space having a different fluid flow bias in direction A.

Normalized property as used in the specification and claims herein means a chemical or physical property of a normalized atmosphere, wherein the normalized atmosphere is one produced specifically for use in the volumetric area surrounding the property monitor. Use of the normalized property surrounding the property monitor permits detection of a change in the property value which occurs when an atmosphere of the multiple zone process different from the normalized atmosphere migrates into the normalized property atmosphere.

BRIEF DESCRIPTION OF THE DRAWINGS

FIG. 2 shows schematics of different fluid flow biases.

DETAILED DESCRIPTION OF THE INVENTION

In accordance with the present invention, a method and apparatus are disclosed which enable control of the flow bias of continuous, multiple zone processes having gas-comprising atmospheres that are in immediate access to each other. By the term immediate access it is meant there is a substantial interfacial area between one atmospheric zone and its adjacent atmospheric zone, which interfacial area is essentially free of impediments to flow of the atmospheres between zones. Control of the flow bias is obtained by applying force on at least one furnace atmosphere. A physical or chemical property of at least one process atmosphere, or a change therein is monitored, which property or change in the property is indicative of the existing flow bias or a change in the flow bias of the at least one atmosphere. An appropriate amount of force is applied to at least one process atmosphere, in at least one of the process zones, in response to the measured property or change in property, to enable control of the overall process flow bias or of the flow bias in at least one of the process zones within a specified range or at a set point. The force is typically applied by injecting a fluid into at least one of the process zones. The force can also be applied using at least one variable constriction means. Typically the variable constriction means is placed at or adjacent to a furnace effluent location. The at least one constriction means is adjusted in response to the flow bias indicating property being monitored. Another possible means of applying force to at least one of the process zones is a mechanical gas-moving means, such as a fan. The mechanical gas-moving means is adjusted to provide the desired force in response to the flow bias indicating property being monitored. Any of the above described means of applying force to the at least one atmosphere can be used in combination with each other.

The preferred method of the present invention applies a force to the at least one atmosphere by the injection of a gas or vapor stream into the atmosphere, which force can be varied by changing the volume of gas or vapor injected, injection pressure, or the direction or net direction of injection in a manner which enables such control. The variable constriction means or the mechanical gas moving means offer the advantage of application of force without requiring additional fluid flow to the process. However, the variable constriction means or the mechanical gas-moving means require moving parts which need maintainence and a power supply. When any combination of fluid injection means, variable constriction means or mechanical gas-moving means is used, the combined means are adjusted in concert in response to the flow bias-indicating property being monitored. The force supplied by the injected fluid, variable constriction means, mechanical gas moving means, or combination thereof can be used to maintain a flow bias in an essentially steady state condition or to alter a flow bias to a new condition.

As previously stated, due to the number of possible applications of the method and apparatus of the present invention, it is not reasonable to discuss each application individually. Thus, the principles of the invention will be discussed in terms of controlling a flow bias within a continuous furnace having a plurality of zones having different atmospheres which have immediate access to each other. In particular, the principles of the invention are discussed with regard to continuous furnaces used to treat metal-comprising parts.

Because of the unique configuration of continuous furnaces, the process atmosphere in a particular zone is susceptible to contamination due to flow imbalances, i.e., changes in flow bias. Typical examples of contamination resulting from flow imbalances are: (1) External ambient air infiltration ($O_2$ and $H_2O$ contamination, typically) through the furnace exit and/or entrance, caused by drafts or incomplete blanketing of the exit/or entrance areas. The incomplete blanketing typically is due to insufficient atmosphere flow from the internal cross sectional area of the furnace toward the exit/or entrance. (2) Incomplete removal of process by-product contaminants from the furnace zone in which they are generated. The contaminants may be in the form of gaseous components or particulate matter which is to be removed through a vent or other furnace opening. The incomplete removal of the contaminants typically is due to incomplete sweeping of the particular furnace zone by the furnace fluid flow designed to carry the contaminants out of the zone. (3) Failure to maintain furnace zone segregation. The migration of the atmosphere existing in one furnace zone into the atmosphere of an adjacent furnace zone which is different causes a contamination of the adjacent furnace atmosphere. In all of these examples, the atmosphere fluid flow which normally performs the function desired is present, but is misdirected.

Methods for measurement of furnace fluid flow bias have not heretofore addressed the complementary problem of control of fluid flow bias within the furnace. Manually setting a flow bias does not result in continuous control of the bias, but rather is the one time manipulation of the flow bias in accord with conditions measured at the time of the setting. Thus, the flow bias is still subject to variations due to events or factors of the type previously described, which affect the furnace fluid flow. The active manipulation of furnace fluid flow parameters is necessary to continuously control the flow bias. The manipulation can be used to maintain the flow bias or to vary the flow bias. Variation of the flow bias is used in response to a change in a furnace variable or parameter which is indicated by the monitored property or change in property. There must be a known relationship between the monitored property and the flow bias. Control of the flow bias can be performed independently of any other furnace variable control and the method and apparatus of the present invention can be operated independently of other factors which influence the flow bias. The present method can be applied whenever there is a furnace atmosphere monitoring technique available which can be related to a flow bias.

Control of the furnace atmosphere in one or more of the zones requires that a property within the furnace be monitored and that force be applied within the furnace in response to the property monitored or a change in the property monitored, to adjust or control the flow bias in the one or more zones. The property to be monitored can be any physical or chemical property which provides the data necessary to enable one skilled in the art to determine the force response necessary to control the furnace flow bias in the manner desired.

Typical furnace properties which can be monitored include: fluid composition (including particle content of fluid composition), temperature, density, viscosity, pressure, velocity of fluid flow, light absorption characteristics, etc. Frequently the furnace property monitored is monitored at locations such as furnace zones, atmosphere zones, boundaries between furnace zones, boundaries between atmosphere zones, boundaries between furnace atmosphere and surrounding external ambient, or at an entrance, exit or vent opening from the furnace.

The property to be monitored can be monitored at one location within the furnace or at more than one location. It has been discovered that property monitoring at one furnace location is generally adequate for many furnace control applications. The location of each monitoring position within the furnace depends on the application. When the property to be monitored is an intensive property, it is sometimes an advantage to provide for mixing in a cross-sectional plane across the width of the furnace at the location of the property sampling means, to ensure that the fluid sample is representative of the fluid flowing through that cross-sectional plane; this mixing can be accomplished by conventional means.

The force used to control furnace atmosphere fluid flow is typically obtained using directed jets of fluid which are injected into the furnace. Although use of directed gas jets to provide force is well known in the art, their use in the manner discovered in this invention has not heretofore been disclosed. The total fluid flow volume within the furnace can be maintained constant by using a portion of the normal total fluid flow to the furnace to provide the force necessary for flow bias control. The portion of fluid flow used to provide the controlling force is applied to the furnace through the jet means and the remainder of the normal fluid flow is applied in the normal manner. Alternatively, the injected fluid used to provide the controlling force can be in addition to the normal total fluid flow through the furnace. The fluid used to apply force can be injected in a single direction within the furnace or can be injected in more than one direction. It has been discovered that for many applications it is adequate to inject fluid at one location within a furnace so long as fluid injected at that location can be injected in more than one direction. Fluid injection devices which permit simultaneous fluid injection in more than one direction permit variation in force magnitude and net direction while maintaining a constant overall fluid injection rate from the jet means.

The force-applying fluid can be any fluid which will not adversely affect the process conducted within the furnace. It is preferred to use one of the fluids which comprises the normal furnace atmosphere in the area into which the fluid is to be injected.

When it is desired to reduce the overall consumption of fluid, or for other process reasons, it is possible to control flow bias using at least one variable constriction device or at least one mechanical gas-moving device. The variable constriction device and/or mechanical gas-moving device is altered in response to the furnace property monitored.

The following examples serve to illustrate the invention but are not to be considered as limitative of the invention.

EXAMPLE 1

Figure 1:
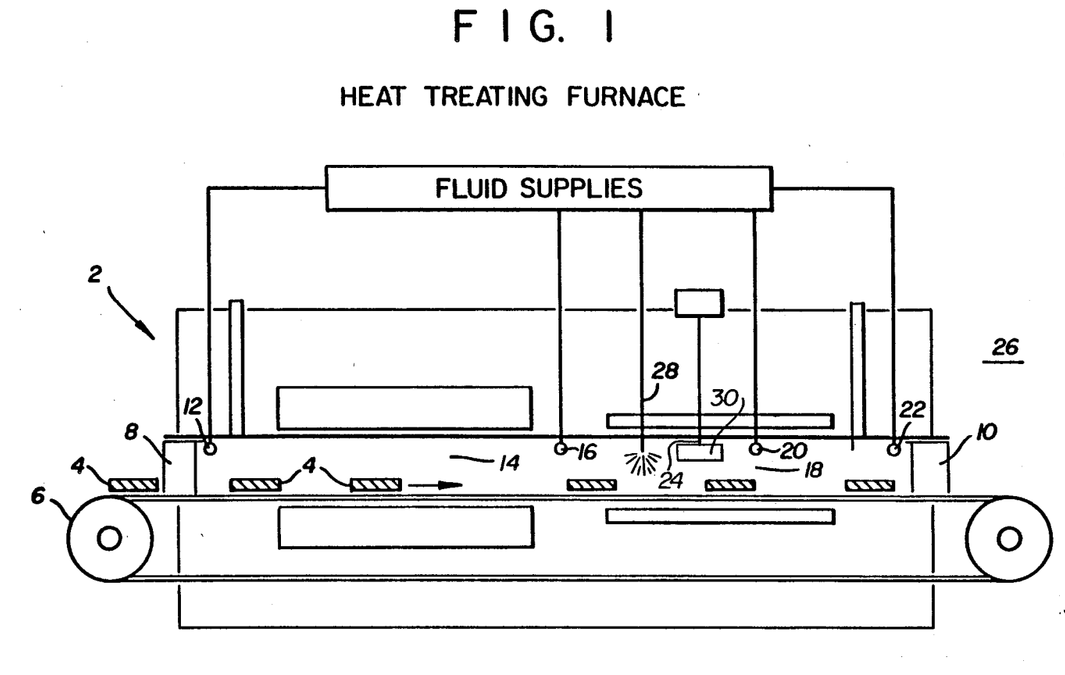
FIG. 1 shows a schematic drawing of a typical continuous heat treating furnace. The furnace comprises various heating and cooling zones and typically comprises zones having distinct controlled atmosphere compositions.

A schematic drawing of a typical continuous furnace is shown in FIG. 1. Parts 4 to be heat treated are placed on a continuous moving belt 6 and enter furnace 2 through an entrance vestibule 8. The parts 4 move on belt 6 into one or more zones of specified atmosphere composition and temperature in which the heat treatment occurs. After entering furnace 2 at entrance 8, the parts 4 experience the furnace atmosphere provided at entrance blanketing means 12. The parts 4 then progress through hot zone 14, experiencing the fluid atmosphere injected via hot zone fluid feed means 16. Subsequently, parts 4 enter cooling zone 18 and experience the fluid atmosphere injected via cooling zone fluid feed means 20. Parts 4 experience yet another environment fluid atmosphere at exit blanketing means 22. To maintain the different atmospheres in each zone of furnace 2 despite changes in part movement through the furnace, room winds, furnace cycling, fluid supply variations, etc., it is beneficial to actively control a fluid flow bias within furnace 2. In some processes wherein it is desired to maintain a particular atmosphere in a particular zone of furnace 2 and not necessary to control adjacent zone atmospheres, it is possible to actively control only the fluid flow bias within the zone to be maintained.

For example, to maintain the fluid atmospheres in each of zones 14 and 18 constant, it is necessary to monitor a selected variable of the furnace atmosphere for change and to control at least the fluid flow biases in zones 14 and 18. Depending of the process involved, it may be possible to maintain the biases in both zone 14 and zone 18 by controlling one of these biases. In some cases, flow biases can be controlled individually while permitting other furnace zone flow biases to vary.

One of the preferred embodiments of the present invention utilizes fluid composition as the variable to be monitored for change. Property monitor 24 is used to detect any change in the composition of the furnace fluid atmosphere adjacent to monitor 24. It is possible to locate monitor 24 at numerous positions within furnace 2, but typically it is preferred to locate monitor 24 in the furnace cooling zone 18 since maintenance and operation of the monitor at this location is more easily accomplished.

The atmosphere composition monitored can be the actual process fluid composition at monitor 24 location or can be a normalized fluid which is typically a diluted form of the actual process atmosphere, depending on the process involved. The normalized fluid is used when the furnace atmosphere composition is the same from one zone to another and fluid can move from one zone to another without affecting the composition being monitored. In such cases, fluid movement from zone to zone is detected by monitoring a normalized atmosphere sample which is present in at least (and often only) the area surrounding monitor 24. For example, when the fluid in cooling zone 18 is nitrogen and the fluid injected at exit blanket means 22 is nitrogen, and it is desired to prevent air (particularly oxygen) from contacting parts 4 in cooling zone 18, fluid which should be flowing from exit blanket means 22 out of the furnace through exit opening 10 might instead be flowing inwardly toward cooling zone 18, but this would not be immediately detected by monitoring furnace fluid composition at monitor 24. If one waits until external air from ambient 26 surrounding furnace 2 reaches monitor 24 (due to failure of exit blanketing means 22 to prevent air from entering through exit opening 10), it will be too late to prevent oxygen from contacting parts 4 in cooling zone 18. By diluting the nitrogen atmosphere surrounding monitor 24 with a different gas, e.g. argon, which does not harm parts 4 in cooling zone 18, a normalized composition different from the furnace fluid composition is generated in the area surrounding monitor 24. Misdirection of fluid flow inwardly from exit opening 10 toward cooling zone 18 is then detected, as nitrogen from exit blanketing means 22 increases the nitrogen content in the area surrounding monitor 24 over that of the (diluted) normalized composition.

A change in the fluid flow bias at a defined plane within cooling zone 18, as detected at monitor 24, is responded to by injection of a fluid which is not harmful to the process (preferably a fluid used to make up the furnace atmosphere) from jet means 28. The fluid from jet means 28 is injected in a manner and direction which provides the force in cooling zone 18 which is necessary to adjust the fluid flow bias at the defined plane, thus maintaining the atmosphere composition zones 14 and 18 within the desired compositional range. In our example, fluid from jet means 28 can be directed toward exit opening 10 so that the applied force from jet means 28 would be increased toward exit opening 10, thus decreasing the nitrogen content in the atmosphere surrounding monitor 24 back to the normalized composition and resulting in a redirection of the furnace fluid flow.

The atmosphere composition zones, temperature zones, atmosphere injection points, atmosphere vent points, and other mechanical arrangements are furnace and process specific and must be determined for each application. The method and apparatus of the present invention can be used to provide atmosphere control independent of the particular parameters of a given furnace.

Figure 2A:
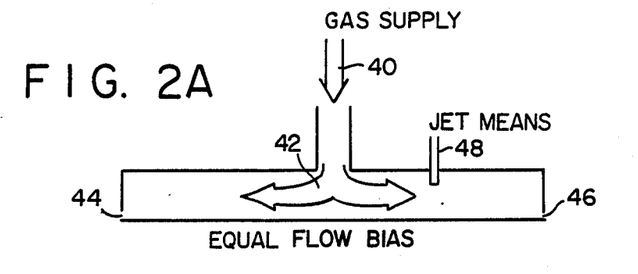
FIG. 2A shows flow biases of equal magnitude.
Figure 2B:
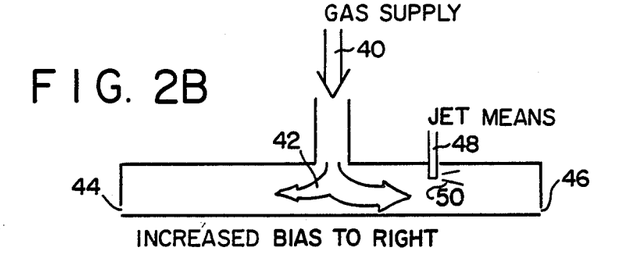
FIG. 2B shows an increase in the right opening flow bias.
Figure 2C:
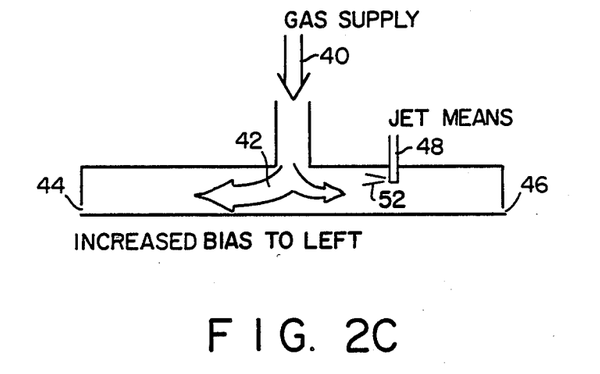
FIG. 2C shows an increase in the left opening flow bias.

A schematic representation of furnace fluid flow bias of the type described above is shown in FIG. 2. FIGS. 2A-2C show fluid vapor or gas 40 comprising the furnace atmosphere in at least one zone being fed into the furnace at point 42 along the furnace length. The composition of the gases comprising the atmosphere in a particular zone of the furnace are specific to the given process. The process fluids exit from the at least one zone of the furnace through openings 44 and 46. The injected gases are partitioned between flowing toward either opening 44 or opening 46 by the flow bias of the at least one zone depicted. FIG. 2A shows flow biases having equal magnitude, with gases 40 flowing equally toward openings 44 and 46. FIG. 2B shows an increase in the right opening 46 flow bias. This increase in opening 46 flow bias can be accomplished by injecting fluid 50 from jet means 48 toward opening 46. FIG. 2C shows an increase in the left opening 44 flow bias. This increase in opening 44 flow bias can be accomplished by injecting fluid 52 from jet means 48 toward opening 44.

Fluid 50 can be the same fluid as fluid 52, or can be different, depending on the process. Jet means 48 can be constructed so that fluid can be injected into the furnace in at least two directions simultaneously, thus a constant total fluid flow from jet means 48 can be maintained, while the desired balance of forces from jet means 48 is obtained.

In one preferred embodiment of the present invention, as described above, control of a furnace fluid flow bias is obtained using a directional orifice jet means to introduce fluid, providing force in a particular direction within the furnace. As the flow through the jet means is increased, more of the furnace atmosphere is entrained in the same direction the jet means fluid flows. As the flow through the jet means is decreased, less of the furnace atmosphere is entrained in the direction the jet means fluid flows. Fluid jets used in the manner described above, wherein the net furnace atmosphere fluid flow is in the direction of the jet fluid flow, are called educting fluid jets. More than one jet means can be used (or a jet means design which permits flow in more than one direction, with the ability to specify the quantity and/or pressure of the flow in each direction available). In another preferred embodiment, oppositional fluid jet means are used to prevent furnace atmosphere fluid flow from flowing in the direction opposite to that of the jet fluid flow. As flow through the oppositional jet increases, flow past it decreases; as flow through the oppositional jet decreases, flow past it increases. The principal difference between the educting fluid jet and the oppositional fluid jet is that the net furnace atmosphere fluid flow (in the area of the fluid jet) is in the same direction as the fluid flow of the educting jet and in the opposite direction of the fluid flow of the oppositional jet. As the net furnace fluid flow in the area of the fluid jet changes direction, the effective action of the fluid jet changes, from educting to oppositional or from oppositional to educting, as the case may be.

Changes in the fluid flow bias are made using the jet means to force the atmosphere in at least one furnace zone to flow in the desired direction. The goal of control of the overall furnace flow bias or the flow bias in a particular zone is typically to maintain the flow bias constant in response to upsets and thereby to maintain a constant furnace atmosphere in the controlled area.

EXAMPLE 2

In brazing of metal parts, contact of oxygen with the parts to be brazed or with the brazing material can result in the formation of metal oxides which prevent or are detrimental to the brazing process or the final product.

In continuous furnace brazing, the furnace atmosphere fluid flow bias is set to exclude air or oxygen from entering the furnace from any external source through furnace openings such as the entrance and exit. However, setting an initial fluid flow bias upon start-up of the furnace alone is frequently not enough to prevent air from entering the furnace, e.g., due to room winds. Air infiltration into the furnace entrance can result in formation of oxides on parts in the hot zone which are detrimental to or prevent the brazement. Air infiltration into the cooling zone via the furnace exit may discolor the parts before they have cooled to a sufficiently low temperature. Thus, it is beneficial to actively control a fluid flow bias within the furnace to prevent air infiltration.

Internal zoning of continuous furnaces refers to the use of different gases or mixtures of gases as the atmosphere in separate sections (zones) of the furnace. The brazing furnace typically utilizes internal zoning wherein a mixture of hydrogen and nitrogen is used in the high heat zone, and pure nitrogen is used in the cooling zone. The presence of hydrogen is not required in the cooling zone, and since hydrogen is more expensive than nitrogen, it is preferred to largely confine the hydrogen to the hydrogen comprising mixture of gases used the hot zone, thus minimizing its consumption. The nitrogen used in the cooling zone is also used to blanket the furnace exit to prevent air infiltration at the exit opening. Detection of excess hydrogen in the cooling zone during furnace operation requires a change in the atmosphere fluid flow bias in the cooling zone towards the hot zone, thus preventing the flow of excess amounts of hydrogen-comprising fluid mixtures into the cooling zone. Detection of increased nitrogen content in the hot zone requires a change in the atmosphere fluid flow bias in the hot zone towards the cooling zone.

The method and apparatus of the present invention were applied to a continuous furnace brazing operation to prevent air infiltration into the furnace and to maintain segregation of the zone atmosphere within the furnace. The furnace cooling zone flow bias was controlled by the application of force at a single site within the furnace.

The furnace was an industrial open-ended heat treating furnace similar to that shown in FIG. 1. The furnace was about 26 inches in width and about 75 feet in length. The furnace internal height was about 12 inches with 4 inch high openings at the entrance and exit ends of the furnace. Total gas flow to the furnace was about 2,000 standard cubic feet per hour (SCFH), typically divided as follows, referring to FIG. 1:

400 SCFH nitrogen at entrance blanketing means 12;
240 SCFH hydrogen at hot zone fluid means 16.
360 SCFH nitrogen at hot zone fluid means 16.
200 SCFH nitrogen at cooling zone fluid feed means 20; and,
800 SCFH nitrogen at exit blanketing means To prevent air from infiltrating the furnace at its entrance vestibule 8 and exit opening 10, respectively, it was determined the minimum gas flows outward from entrance vestibule 8 to the external ambient 26 and outward from exit opening 10 to the external ambient are about 700 SCFH and about 500 SCFH respectively (total of 1,200 SCFH). When these flow requirements were not met, the process produced a product which did not meet specifications for final surface color and/or braze properties. Since total gas flow to the furnace exceeds the 1,200 SCFH total requirement by about 800 SCFH, the gas flow toward entrance vestibule 8 can range from about 700 SCFH to about 1,500 SCFH and the gas flow toward exit opening 10 can range from about 500 SCFH to about 1,300 SCFH.

The total amount of gas flow into furnace 2 could be reduced from the 800 SCFH excess gas flow to a lesser excess gas flow. However, in practice it was discovered that for this particular furnace, the 800 SCFH excess gas flow produced good quality parts the majority of the time.

During operation of the furnace without any means of flow bias control, the gas composition in cooling zone 18 varied over a wide range. With most of the excess gas flowing toward furnace exit opening 10 (minimum flow out the entrance), the gas composition in cooling zone 18 comprised as high as about 24% by volume hydrogen in about 76% by volume nitrogen with no detectible oxygen. A cooling zone 18 fluid composition having a concentration greater than about 24% by volume hydrogen indicated too high a fraction of total gas flow toward furnace exit opening 10 and the probable infiltration of air into furnace entrance vestibule 8.

With most of the excess gas flowing toward furnace entrance vestibule 8 (minimum flow out the exit), the gas composition in cooling zone 18 comprised as high as 100% by volume nitrogen with no detectible oxygen. The presence of oxygen in cooling zone 18 indicated too high a fraction of total gas flow toward furnace entrance vestibule 8 and the infiltration of air into cooling zone 18 via furnace exit opening 10. Discolored brazed parts were observed when air infiltrated into cooling zone 18.

Thus, during acceptable furnace operating conditions at the about 2,000 SCFH overall gas flow rate, the hydrogen concentration in cooling zone 18 should be greater than about 0% by volume up to about 24% by volume, with no detectable oxygen present. The outside range concentrations represent extremes and are typically indicative of near-failures to protect the entrance and exit openings of the furnace from air infiltration.

The flow bias toward exit opening 10 at a defined plane within cooling zone 18 is directly related to the hydrogen concentration in cooling zone 18, since an increase in the fluid flow bias at the defined plane toward exit opening 10 resulted in an increase in the amount of hydrogen detected at cooling zone gas monitor 24 (up to a maximum of about 30% by volume under the flow rate conditions described herein). Thus, cooling zone 18 fluid composition is indicative of the furnace flow bias.

By analyzing a sample of gas drawn from the area of monitor 24 within cooling zone 18 for hydrogen concentration, the approximate fluid flow bias toward exit opening 10 from the defined plane in cooling zone 18 was deduced. In addition, when the analysis showed an essentially constant hydrogen composition, this indicated an essentially constant fluid flow bias at the defined plane. Thus, hydrogen concentration was used as the monitored property in this specific control scheme. Control of the flow bias was based on an algorithm between hydrogen concentration and actual flow bias at the defined plane at the time hydrogen concentration was measured. Control action via jet means 28 in response to a measured hydrogen concentration in the furnace cooling zone 18 was used to minimize variation in the fluid flow bias in cooling zone 18 while ensuring that air did not infiltrate furnace 2 via entrance vestibule 8 and exit opening 10.

The control action employed in this preferred embodiment was injection of nitrogen through a gas jet means 28 which permitted nitrogen injection in either direction from the vertical center plane along the lengthwise major axis of the furnace. The gas flow direction inside the furnace was driven toward either furnace entrance vestibule 8 or furnace exit opening 10 using gas jet means 28.

The gas jet means 28 comprised two orifice gas jets, each with an orifice opening of about 3/64 inch in diameter, which pointed in opposite directions (toward entrance vestibule 8 and exit opening 10) and which were coaxial with each other, mounted in the vertical center plain along the major furnace axis, as described above. The jet means 28 was inserted into the furnace through the cooling zone 18 roof, and extended about three inches into the cooling zone 18 chamber. The gas flow through each jet could be varied from about 0 to about 100 SCFH.

The gas jet facing exit opening 10 was used to drive the furnace gas flow toward furnace exit opening 10, and the gas jet facing entrance vestibule 8 was used to drive furnace gas flow toward entrance vestibule 8. When it was desired to maintain a constant jet gas flow to the furnace, the two jets were balanced; the gas flow from one jet was increased while the gas flow from the other jet was decreased, and total gas flow was maintained at about 100 SCFH. Use of a constant gas jet total flow improved the stability of the furnace because the total fluid flow of the furnace was not changed as the force applied was changed. The response characteristics of the furnace control were improved and the range of controllability was extended using the jet means balancing technique.

Figure 3:
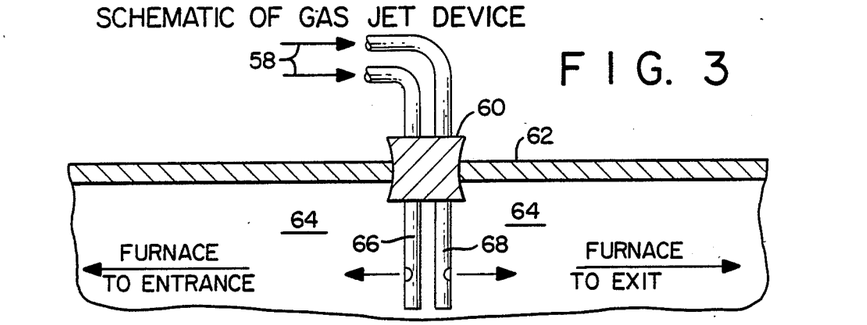
FIG. 3 shows a schematic of the gas jet means used in the preferred embodiment of the present invention. This schematic is not intended to act as a limitation on the design of the gas jet device, but merely to illustrate one possible design.

A schematic of the gas jet device is shown in FIG. 3. The device 60 extended through furnace roof 62 into furnace zone 64. Gas was supplied to jets 66 and 68 through gas supply lines 58. The furnace entrance-facing jet 66 was used to oppose general furnace gas flow movement toward furnace exit opening 10. The furnace exit-facing jet 68 was used to educt general furnace gas to move toward the furnace exit opening 10. The gas flow rates through jet 66 and jet 68 were concerted so that a constant overall gas flow of about 100 SCFH was maintained while the individual gas flow rate from either jet was varied between 0 and about 100 SCFH.

By varying the nitrogen flow rate through each jet in concert, the flow bias could be increased or decreased in either direction. This enabled the maintenance of an essentially constant furnace cooling zone 18 flow bias. The range of jet means force required is application specific, but the driving force required can be applied using gas composition analysis to indicate the existing fluid flow bias, and an appropriate gas jet means response based on an algorithm between the measured gas composition and the desired furnace flow bias. In this preferred embodiment, the control algorithm used to relate the analyzed physical property to the jet means response was placed in a microprocessor-based controller. The controller was an industrially available proportional, Integral, and Derivative (PID) controller, which provided excellent control.

The control action used was essentially as follows: Referring to FIG. 1, when cooling zone 18 hydrogen concentration was less than the set point, nitrogen flow was increased to the exit opening 10-facing portion of jet means 28 and decreased to the entrance vestibule 8-facing portion of jet means 28 (more hydrogen-bearing gas was drawn into cooling zone 18, returning the hydrogen level to the control set point). When cooling zone IS hydrogen concentration was greater than the set point, nitrogen flow was decreased in the exit opening 10-facing portion of jet means 28 and increased in the entrance vestibule 8-facing portion of jet device 28 (less hydrogen-bearing gas was permitted to flow into cooling zone 18, returning the hydrogen concentration to the control set point). These two actions maintained the hydrogen concentration in cooling zone 18 relatively constant, indicating an essentially constant flow bias in cooling zone 18. During the particular control action described above, derivative control action enabled prediction of the achievement of setpoint based on rate of change of hydrogen concentration and thus prevented overshoot in the control mechanism.

The gas composition in cooling zone 18 was sampled for analysis by the analyzer. The gas analysis results were fed to the controller which compared the actual analysis result with the desired analysis result. The controller then determined changes required in the gas jet means fluid flow in view of the control algorithm previously discussed.

Figure 4A:
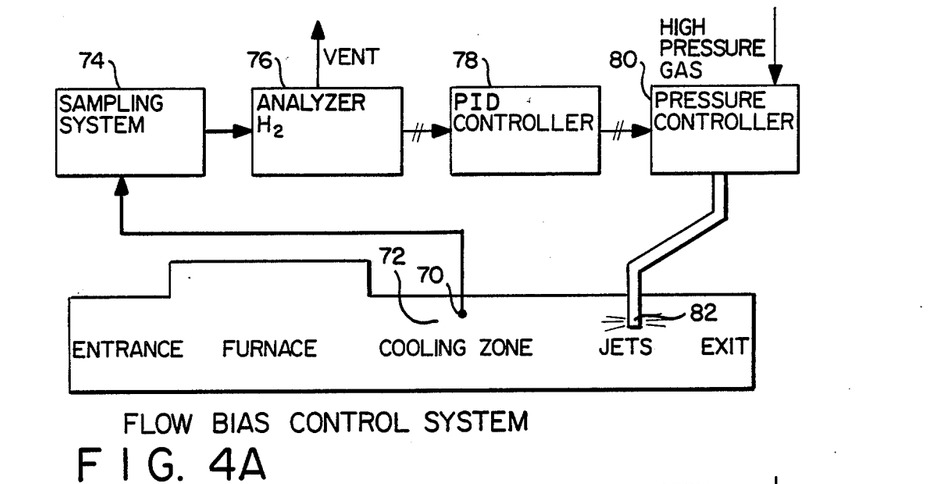
FIG. 4A shows a schematic of the flow bias control system means used in the preferred embodiment of the present invention. This schematic is not intended to act as a limitation on the design of the flow bias control system, but merely to illustrate one possible design.

A schematic of the control system used to implement the present invention is shown in FIG. 4A. Sample point 70 was located within furnace zone 72. Sample obtained at sample point 70 was drawn into sampling system 74 which conditioned the sample for analysis of the particular furnace atmosphere constituent of interest, hydrogen in this case, by analyzer 76. The hydrogen concentration data determined by analyzer 76 was transmitted to PID controller 78, which controller 78 sent a signal to gas jet pressure controller means 80, which supplied high pressure nitrogen to gas jet means 82.

Figure 4B:
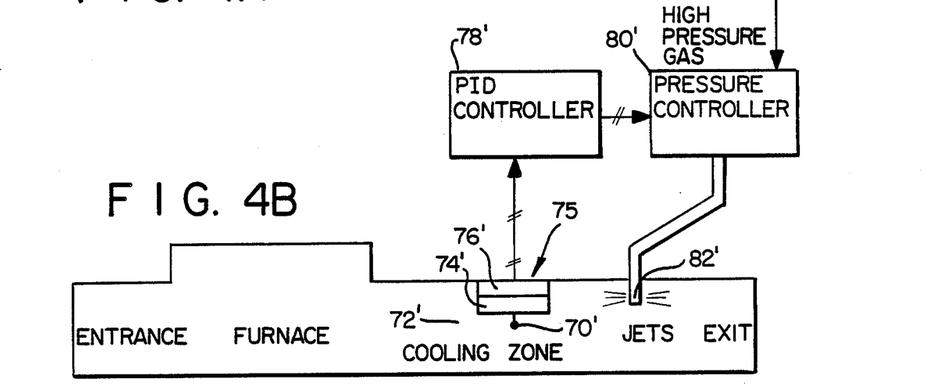
FIG. 4B shows a schematic of an alternative control system to FIG. 4A, wherein the sampling means and analyzing means of the system are combined into one instrument means which is placed in at least one of the zones of the multiple zone process, and wherein a response determining means, such as a PID Controller, is in communication with the combined instrument means.

An alternative control system schematic is shown in FIG. 4B, wherein sample point 70', sampling system 74' (if necessary) and analyzer 76' are combined into one instrument means 75 which is placed within furnace zone 72'. The analytical data determined by analyzer portion 76' of instrument means 75 is transmitted to PID Controller 78' which sends a signal to gas jet pressure controller means 80' which supplies a high pressure gas to jet means 82'.

Referring again to FIG. 1, for this brazing application, the set point reference for the PID controller, 78 shown in FIG. 4, was about 2% by volume hydrogen concentration in cooling zone 18. This corresponds to a flow split of furnace gas flow of about 990 SCFH out entrance vestibule 8 and about 1010 SCFH out exit opening 10. The additional jet means flow of nitrogen gas exited through the opening closest to the jet means location, exit opening 10. Thus, without any overall furnace gas flow reduction, the furnace gas split is about 990 SCFH out entrance vestibule 8 and about 1,110 SCFH out exit opening 10.

Since the above-described furnace bias control provides overall furnace gas flows which are more consistent, the furnace operator can reduce the overall gas flow volume to the furnace. In this example, the total flow to the furnace was reduced substantially while providing consistent quality brazed parts. For a test period of about one shift, the gas flow rates were set as follows, with reference to FIG. 1:
100 SCFH nitrogen at entrance blanketing means 12;
240 SCFH hydrogen at hot zone fluid feed means 16;
360 SCFH nitrogen at hot zone fluid feed means 16;
200 SCFH nitrogen at cooling zone fluid feed means 18;
200 SCFH nitrogen at exit blanketing means 22; and,
100 SCFH nitrogen to the jet means 28.

As a result of the above gas flows, a total of only 1,200 SCFH of gas flow was used compared with 2,000 SCFH of gas flow the furnace originally required when no control system was used. In addition to the gas flow requirement cost savings, improved reliability of furnace operation provided more consistent, higher quality parts.

Figure 5:
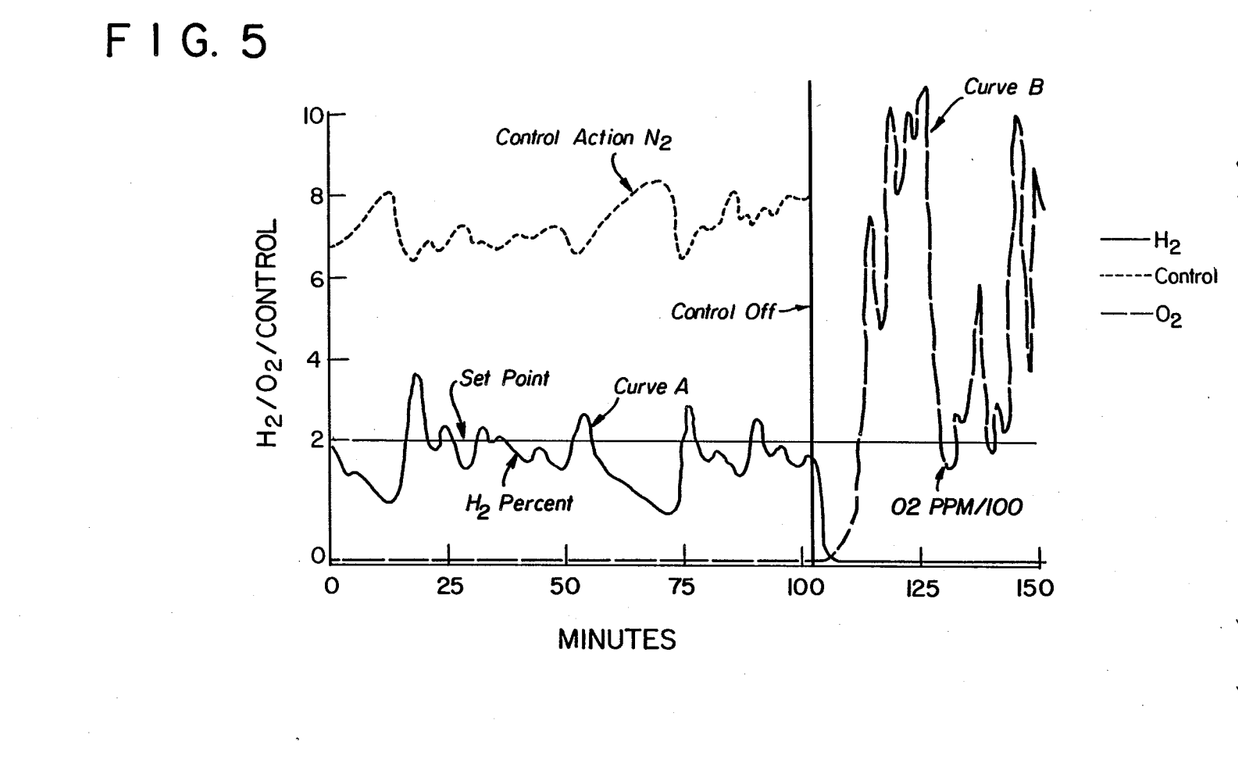
FIG. 5 shows the computer printout of particular components comprising the atmosphere of the cooling zone in a continuous multi-zone furnace used in a metal brazing process. The desired set point for hydrogen gas concentration in the cooling zone of the furnace is shown along with the actual hydrogen gas concentration. The chart also shows the relative response of the control system which provides the injection of nitrogen gas into the cooling zone to provide force which enables control of the hydrogen concentration in the cooling zone. The chart shows that so long as the nitrogen gas is injected to actively control the hydrogen concentration in the cooling zone, no oxygen enters the cooling zone. However, when the active control is discontinued, oxygen enters the furnace from the exit end of the furnace, sweeping into the cooling zone and displacing the hydrogen comprising atmosphere in the zone.

However, the more preferred furnace overall gas flow rate is less than 2,000 SCFH but greater than 1,200 SCFH for the furnace described in this example. Overall gas flow rates somewhat greater than 1,200 SCFH are recommended to provide a more stable process operation. FIG. 5 shows a computer printout of a chart generated for the cooling zone during a metal brazing operation of the kind described in EXAMPLE 2 above. The overall gas flow rate to the furnace was about 2,000 SCFH. With reference to FIG. 1, the desired set point for hydrogen gas concentration in cooling zone 18 was about 2% by volume. The chart shows the actual hydrogen gas concentration of the cooling zone 18 atmosphere as measured during furnace operation; the actual oxygen gas concentration of the cooling zone 18 atmosphere; and the relative response of the control system which provided for the injection of nitrogen gas from jet means 28 into the cooling zone 18 atmosphere, to actively control the hydrogen concentration in the cooling zone 18 atmosphere.

During the first 100 minutes of operation shown in the chart, the flow bias in the cooling zone was actively controlled by proper injection of nitrogen gas via jet means 28 of FIG. 1 into the cooling zone in response to the analysis of the fluid in the cooling zone made by monitor 24, in accordance with this invention. During this period of about 100 minutes, the hydrogen concentration in cooling zone 18 remained essentially in the vicinity of the set point and no oxygen entered cooling zone 18. At the end of this period of about 100 minutes, the monitor 24 and associated jet means 28 control procedure of this invention was terminated. Upon termination of this active control via controlled nitrogen injection, flow bias in the cooling zone became disrupted and oxygen entered the furnace cooling zone 18 from exit opening 10 of the furnace, sweeping into cooling zone 18 and displacing the hydrogen-comprising atmosphere in the cooling zone 18, as shown in the furnace operation period of from about 100 minutes to about 150 minutes. The FIG. 5 chart shows plots of the volume % concentration of hydrogen in the cooling zone 18 atmosphere (Curve A) and the concentration of oxygen in the cooling zone 18 atmosphere in parts per million divided by 100 (Curve B).

The particular gas compositions used in the furnace, the overall gas flow rate, and the controlling gas jet means fluid flow rate, are process and furnace specific and thus depend on the individual application involved. However, the basic principals involved in control of the flow bias of atmospheres in a multi-zoned process remain the same.

Control of an atmosphere flow bias in a heat treating process improves the process by: Substantially stabilizing fluid atmosphere composition throughout the furnace; preventing contaminant intrusion; facilitating the removal of by-products generated in particular furnace zones by the heat treating; optimizing fluid consumption: improving atmosphere zone integrity within the furnace; stabilizing atmosphere temperature; extending process controllability; and decreasing susceptibility to external variables. Control of flow bias by the method of the present invention is applicable to all continuous furnace processes and any other flow systems, such as continuous food freezers, ducts and vents, for example.

The above examples illustrate typical preferred embodiments for application of the present invention and the best mode of the invention as presently contemplated. However, this invention has a broad range of applicability and is susceptible to modification and alternate constructions based on the embodiments disclosed. Consequently, it is not intended that the preferred embodiments act as limitations of this invention. On the contrary, the intent is to include all modifications and alternate constructions falling within the spirit and scope of the invention as expressed in the appended claims.

What is claimed is:

1. A method for controlling fluid flow bias within a multiple zone furnace chamber having a free flow of non-air containing gas atmospheres from one zone to another, comprising:
   (a) withdrawing a sample of non-air containing atmosphere from within at least one of said zones;
   (b) analyzing said non-air containing atmosphere sample for at least one chemical or physical property that is indicative of the existing flow bias, or of a change in said flow bias, in the zone from which said sample was withdrawn;
   (c) comparing the property value, or change in property value, obtained upon the analysis of step (b)

above with a reference set point or range for said property, or change of property; and (d) injecting a non-air containing fluid into one of said zones of non-air containing gas atmospheres so as to actively apply a force within one of said zones in response to said comparison of the analyzed property value, or change in property value, with the reference set point of range, thereby controlling the fluid flow bias within said zones to conform the analyzed property with said reference set point or range, whereby fluid flow bias within the multiple zone furnace is conveniently controlled without the introduction of air into the multiple zone furnace or into the gas analysis sample and system employed for such control purposes.

2. The method of claim 1 wherein said at least one selected property monitored is selected from the group consisting of atmosphere composition, including particle content; temperature; density; viscosity; pressure; velocity; and light absorbence characteristics.

3. The method of claim 1 and including mixing the non-air containing gas atmosphere in the cross-sectional plane of the zone from which the sample of non-air containing atmosphere is withdrawn to provide an atmosphere representative of the average property value of the cross-sectional area of said plane for the desired sampling and analysis of the non-air containing atmosphere within the zone.

4. An apparatus for controlling fluid flow bias within a multiple zone furnace chamber having a free flow of non-air containing gas atmospheres from one zone to another therein, comprising:

(a) sampling means for withdrawing a sample of non-air containing atmosphere from within at least one of said zones;

(b) means for analyzing said non-air containing atmosphere sample for at least one chemical or physical property that is indicative of the existing flow bias, or of a change in said flow bias, in the zone from which said sample was withdrawn;

(c) means for comparing the property value, or change in property value, obtained upon the analysis of step (b) above with a reference set point or range for said property, or change of property; and (d) means for injecting a non-air containing fluid into one of said zones of non-air containing gas atmospheres so as to actively apply a force within one of said zones in response to said comparison of the analyzed property value, or change in property value, with the reference set point or range, thereby controlling the fluid flow bias within said zones to conform the analyzed property with said reference set point or range, whereby fluid flow bias within the multiple zone furnace is conveniently controlled without the introduction of air into the multiple zone furnace or into the gas analysis sample and system employed for such control purposes.

5. The apparatus of claim 4 in which said means for injecting a non-air containing fluid into one of said zones comprises fluid jet means.

6. The apparatus of claim 4 and including mixing means adapted to mix the non-air containing atmosphere in the cross-sectional plane of the zone from which the sample of non-air containing atmosphere is withdrawn to provide an atmosphere representative of the average property value of the cross-sectional area of said plane for the desired sampling and analysis of the non-air containing atmosphere within the zone.

* * * * *